TAPE TRANSPORT DRIVE SYSTEM

Filed Sept. 3, 1963 2 Sheets-Sheet 1

INVENTORS
MARTYN A. LEWIS
BEN C. WANG
ROBERT A. KLEIST

BY

Robert G. Clay
ATTORNEYS

BY

INVENTORS
MARTYN A. LEWIS
BEN C. WANG
ROBERT A. KLEIST

Robert G. Clay
ATTORNEYS

United States Patent Office 3,379,948

Patented Apr. 23, 1968

3,379,948

TAPE TRANSPORT DRIVE SYSTEM

Martyn A. Lewis, Culver City, Ben C. Wang, Los Angeles, and Robert A. Kleist, Woodland Hills, Calif., assignors to Ampex Corporation, Redwood City, Calif., a corporation of California Filed Sept. 6, 1963, Ser. No. 307,161

12 Claims. (Cl. 318—253)

ABSTRACT OF THE DISCLOSURE

An electrical motor drive system for a motor having an output torque proportional to applied driving current which driving current is provided by a servo amplifier. The input signals to said servo being in the form of a ramp function responsive to the difference between desired motor speed and actual motor speed, and the slope of which is selected in accordance with desired acceleration and deceleration.

This invention relates to motor drive circuits, and particularly to a servo system for providing closely controlled intermittent and bidirectional operation of motors and other mechanical driving members.

It is necessary for many modern applications to drive a motor or other driving means, such as those used in transporting a tape or a web material, in a precisely controlled fashion through an arbitrary sequence of bidirectional movements. In addition to maintaining the motor speed at a selected nominal velocity, such systems must also provide precise start and stop characteristics at high accelerations and decelerations. A good example of the stringent requirements which must be met by motor drive systems may be found in recently developed magnetic tape transport systems of the type disclosed in connection with the copending U.S. applications of Robert A. Kleist entitled "Drive System for Tape Transport Systems," Ser. No. 267,175, filed Mar. 22, 1963, now U.S. Patent 3,185,364, Robert A. Kleist and Ben C. Wang entitled, "Magnetic Tape Transport System," Ser. No. 268,140, filed Mar. 26, 1963, now U.S. Patent 3,251,563, and of Martyn A. Lewis entitled, "Motor Drive Circuit," Ser. No. 267,166, filed Mar. 22, 1963, now U.S. Patent 3,293,522, all of which are assigned to the assignee of the present invention. Systems of this type employ a single drive capstan coupled directly to the rotor of a reversible drive motor. In this system, the drive capstan is in constant engagement with the tape which is held in a low friction, relatively low tension path. The tape path is so arranged as to provide a large wrap angle about the capstan in order to eliminate slip between the capstan and the tape. The tape tension is maintained substantially equal and constant on both sides of the capstan and low tension differentials are maintained at all times. Controlled accelerational characteristics may consequently be imparted to the tape solely by electrical control in starting and stopping the capstan drive motor. Heretofore such systems have been accelerated and decelerated at substantially constant rates by the application of selected current waveforms applied during start and stop intervals. Thus, acceleration might be held substantially constant by saturation of the servo amplifier during start and stop intervals. Friction and torque-to-current characteristics may vary between systems and because of wear, however, and so start and stop distances may also vary over a moderate range, e.g., ±10%. Also, the friction in the system tends to increase start distances and decrease stop distances, making them unequal.

Therefore, the operation of this type of system requires, among other things, accurate control of the acceleration and deceleration of the drive motor, as well as the ability to maintain the motor at the selected nominal velocity when desired, all in response to applied command signals available from data processing or other command systems. If sufficiently accurate control can be accomplished, the driven member can be moved selected distances or in programmed steps without the use of spatial reference patterns or controls.

Comparable motor drive system requirements are to be found in a number of other applications, and the invention should be considered to be applicable to all such systems. Thus, the ability to cause a mechanical member to follow a given function is, in a general sense, one capability of systems in accordance with the invention. However, the discussion will proceed with relation to the above-mentioned types of tape transport systems, particularly those used for digital data processing applications, because such systems must supply and receive information from high speed data processing systems in compatible fashion and must accordingly operate with high speed precision in all respects.

It will be realized by those skilled in the art that the distances traveled by the tape in starting and stopping operations are of particular importance when handling digital data, because gaps must be provided on the tape between successive records during which no data transfer can take place until nominal velocity has been reached. These interrecord gaps must be made adequate for all conditions which might be encountered, but the gap length should, as a practical matter, be kept to a minimum for efficient use of the data recording capability of the tape. An increase in the gap length results in decreased effective density with which data may be recorded on a given length of tape, even though the bit per inch density within a record remains the same throughout. At a minimum, the interrecord gaps must correspond to those established for standard tape formats.

With the motor drive system heretofore described, the tape or other driven member may be advanced in incremental or step by step fashion. This is of particular value with digital data magnetic tape systems used in cooperation with processing or output systems which operate at a relatively slower rate than high speed computers or which operate intermittently within a data message interval. Heretofore, it has been necessary to use punch card or paper tape mechanism for recording intermittently received data under these conditions, and then using converters to later record the data on magnetic tape in a standard format.

Therefore, it is an object of the present invention to provide an improved circuit for driving a motor bidirectionally at a selected nominal velocity, while providing improved control of the start and stop characteristics.

Another object of the present invention is to provide an improved motor drive system for transporting tape or web material bidirectionally with more carefully controlled start and stop characteristics.

Another object of the present invention is to provide an improved system for the generation of a controlled mechanical movement which follows a predetermined function.

A further object of the invention is to provide an improved magnetic tape transport system for intermittent, bidirectional operation, which system is characterized by a high degree of predictability in start and stop characteristics and a more uniform response to simple command signals.

Another object of the present invention is to provide an improved circuit for generating controlled waveforms, such as trapezoidal waveforms from a signal which changes between different direct current levels.

Yet another object of the invention is to provide an improved ramp generator circuit for converting a step input command signal into signals having constant finite slope between levels.

Systems constructed according to the present invention provide improved operation to fulfill the stated objects of the invention by exercising positive servo control of the motor speed during the start and stop intervals. In one aspect of the invention, the command signals are provided through a ramp generator to the input of a non-saturable amplifier coupled to drive the capstan motor. The motor is accelerated or decelerated with reference to the instantaneous amplitude of the constant slope signal derived from the ramp generator. The non-saturable amplifier is designed to provide the maximum anticipated current necessary for acceleration, this current being established in a very short time compared with the start or stop time period. Thus, if the system friction increases or other variations are encountered in system paramaters, the amplifiers provides the higher accelerating or decelerating current by extremely small changes in the error voltage occurring at the input to the amplifier. The error voltage may be maintained small in comparison to the final value of the command signal, so that the start or stop time will remain unaffected. A feature of the invention is the provision of tape transports which may provide standard increments of movement for both starting and stopping.

In accordance with another particular aspect of this invention, an improved ramp generator is provided so that the normally available step function input command signals may be converted into a ramp function of constant slope terminating at the end of a prescribed start or stop time at a given reference level. This is accomplished in accordance with the invention by providing the step input command signal through an input resistor to saturate a push-pull connected input stage, the output of which is applied to charge a capacitor at a constant rate through a constant current stage. The voltage builds up on the cpacitor at a linear rate, and is applied through a decoupling output stage to an output terminal. A feedback resistor is connected between the output terminal and the input terminal and has a value which is equal to the input resistor, so that when the output voltage, which is of opposite polarity, reaches the level of the applied input command signal, the input terminal is at zero voltage thereby cutting off the input stage to prevent further charging of the capacitor.

Particular aspects of the invention provide that the ramp generator may be transistorized to include a push-pull grounded base input stage, a push-pull common collector stage with emitter degeneration for providing constant charging current to the capacitor, and a push-pull emitter follower output stage. In this manner, the step input command signals may be converted to signals having constant slope accelerating and decelerating ramp functions which may then be applied to the input of the servo system to accomplish the desired servo operation during stop, start and nominal speed intervals.

A better understanding of the invention may be had by reference to the following detailed description, taken in conjunction with the accompanying drawings in which.

Figures 1, 5:
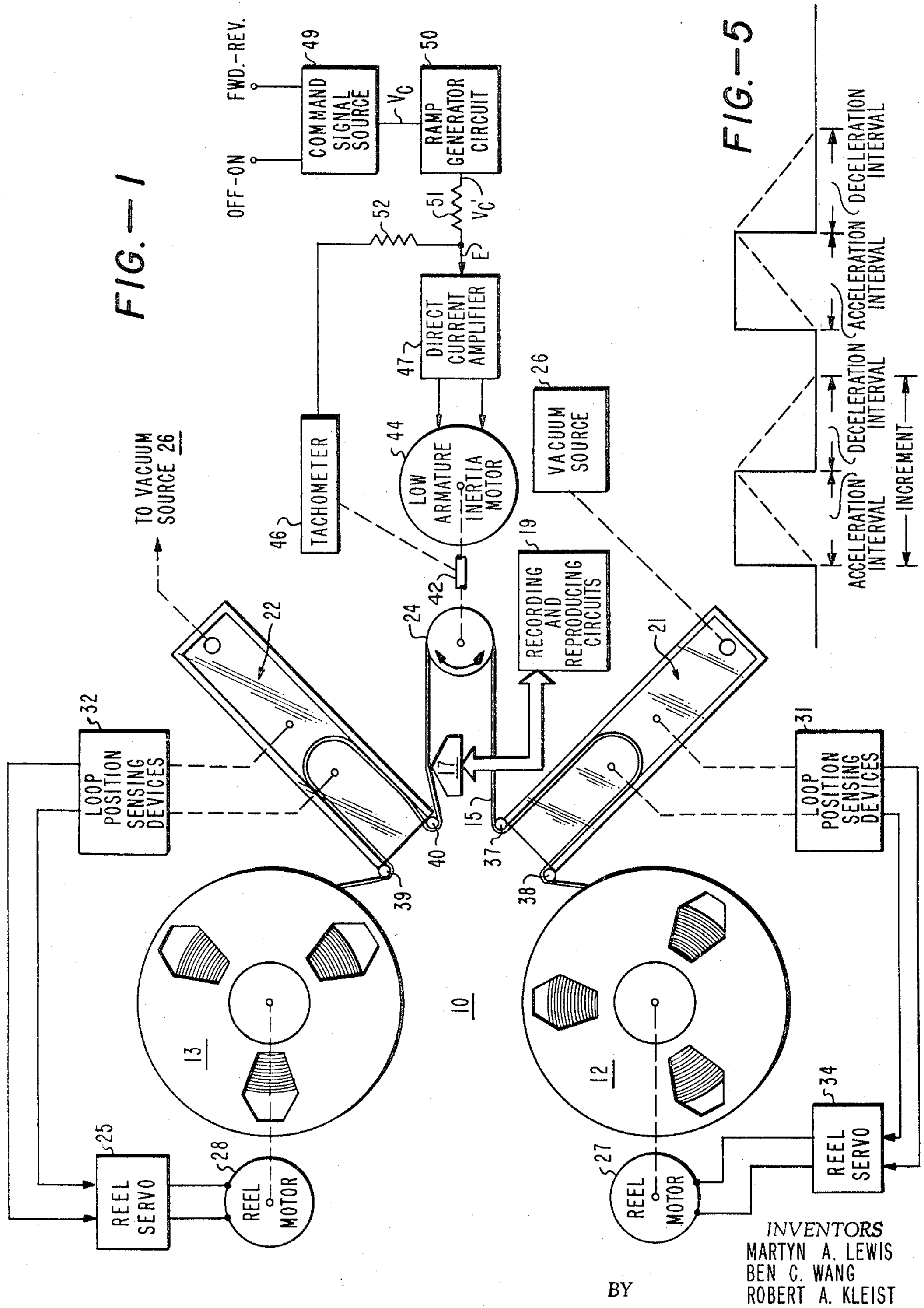
FIG. 1 is a combined, simplified elevation and block diagram representation of a motor drive system in accordance with the present invention used in conjunction with a magnetic tape recording system.

A digital tape transport system such as may employ the motor drive system of the present invention to best advantage is illustrated in FIG. 1 as to its general organization. The details of such a system which are not concerned with particular aspects of the present invention have either been omitted or been illustrated generally where possible in order to simplify the description, but their use will be understood by those skilled in the art. The mechanical elements of the tape transport system are mounted on a front panel 10, and include a tape supply reel 12, and a tape take-up reel 13, the designation "supply" and "take-up" being used solely for convenience. Between these reels 12 and 13, a tape 15 is moved bidirectionally in a low friction, relatively low tension tape path. Tyicpally, the magnetic tape 15 or the web material is to be driven in a forward or reverse direction past a magnetic head assembly 17 coupled to recording and reproducing circuits 19, which are interconnected with an associated data processing system (not shown). The data processing sysem or some other related means provides forward and reverse, and off and on signals for controlling the tape transport mechanism. Inasmuch as the transfer of data and the provision of these control signals may be achieved by conventional means, no further explanation is provided herein.

The tape supply and take-up reels 12 and 13, a pair of vacuum chambers 21 and 22, and a centrally disposed drive capstan 24 are arranged symmetrically in a compact configuration on the front panel 10. Each of the vacuum chambers 21 and 22 is positioned between the capstan 24 and a respective one of the reels 12 or 13 to effect decoupling of the tape at the capstan from the high inertia reels, and to provide a storage length to accommodate the relatively slower reel motor response. Each chamber includes a vacuum port coupled to a vacuum source 26 so that the tape may be drawn into the chamber to form a loop of variable length which constitutes the buffer needed for mechanical decoupling and storage. The capstan 24 may be driven in a regular sequence of forward and reverse motions, but the relatively slower acting reels 12 and 13 need not have a similar movement, since the buffer absorbs the relatively fast changes in tape movement between the chambers.

In order to maintain the length of the tape loops within selected limits, each of the reels 12 and 13 is driven by an associated reel motor 27 or 28, which is coupled in a servo loop deriving driving signals from position sensing mechanisms in the chambers. Here, loop position sensing devices 31 and 32, containing, for example, differential pressure switches coupled to each of two sensing holes in a chamber, provide error signals to the reel servo circuits 34 and 35, respectively. Other loop sensors, such as photoelectric devices, may be used in place of the switches, and additional signal generators such as tape velocity sensors may be employed in the servo loop. Each of the reel servos controls the movements of a connected reel motor 27 or 28, respectively so that the reels 12 and 13 are turned appropriately to withdraw tape from or supply tape to the chambers and the capstan during operation. This system for driving the reels 12 and 13, and conventional modifications in this system such as the use of other forms of loop sensing servo systems, are well understood by those skilled in the art. However, as previously explained in the aforementioned patent applications, this tape transport system materially differs from the systems heretofore used inasmuch as there are no high tension forces, high friction forces or high impact forces on the tape. The two vacuum chambers 21 and 22 maintain substantially equal low tension on the tape paths of tape guides 37, 38 and 39, 40 at the entrance and exit ends of the two vacuum chambers 21 and 22, respectively, together with the contact of the tape 15 at the chamber wall and at the magnetic head assembly 17, produce the only frictional or inertial forces in the tape path to resist tape movement by the capstan 24. On the other hand, the drive capstan 24 has a highly frictional and partially resilient surface, for instance one having a rubber like surface, so that the tension on the tape may be maintained at a relatively low value, such as 0.5 pound, while still maintaining the frictional contact needed for driving the tape in a non-sliding relation.

The absence of friction in the tape path, along with the presence of low-inertia compliance mechanisms, insures that the tape 15 is driven solely by the action of the capstan 24. In addition since the tape tension need be only in excess at that level to prevent slippage between the tape and the capstan during acceleration, the tension can be maintained at a sufficiently low level to preclude introduction of any material loading to be overcome in turning the capstan 24 to move the tape 15. The inertia of the motor and the capstan is substantially an order of magnitude greater than the inertia and frictional forces along the tape, thus permitting the movement of the motor and the capstan to be determinative of the movement of the tape.

This facility for direct control of the tape movement may be utilized in a cooperative relationship with electronic means for generating signals for the precise control of the tape as to start, stop and nominal speed characteristics. The capstan 24 is directly coupled by a motor shaft 42 to a high torque-to-inertia ratio direct current motor 44, for example, the type of motor containing a planar rotor with windings disposed as printed circuit conductors thereon.

This type of motor is preferred for the tape transport application, because it not only has a high torque-to-inertia ratio but also has a substantially linear torque versus current characteristic over a relatively wide range. Thus, when coupled to a mechanical system having a very low and substantially constant counter torque, the magnitude and polarity of the applied current may be used to control accurately and completely the operation of the mechanical system. A linear characteristic in the motor is not necessary as long as the torque characteristic continues to increase with increasing current.

In accordance with the present invention, the improved control of start and stop characteristics is provided by a servo system including a feedback tachometer 46 and a direct current amplifier 47 for providing current flow in either direction to the windings of the motor 44. In response to forward-reverse and on-off signals applied to a reference signal source 49 from a data processing system or the like, a ramp generator 50 produces positive or negative polarity signals having an amplitude representative of the desired motor velocity both during intervals of acceleration and deceleration and during intervals when the motor 44 is running at the desired nominal velocity. These signals are applied to an input impedance, generally illustrated as a resistor 51, to the input of the direct current amplifier 47. The tachometer 46 is coupled to provide a negative feedback signal through a feedback impedance, generally illustrated as a resistor 52, to proportionally decrease the amplitude of the input signal to the amplifier 47 as the tape approaches the desired velocity. The direct current amplifier 47 has a high gain so as to be able to provide sufficient current to drive the motor 44 at the required accelerational rate in the presence of the maximum anticipated system friction and the lowest anticipated motor torque per unit current. A suitable servo amplifier for the purpose, which additionally provides dead-band operation to prevent movement of the tape in the absence of a true command signal, is disclosed in the copending U.S. patent application of Richard C. Tobey, entitled "Amplifier Circuit" filed Sept. 6, 1963, Ser. No. 307,117, and assigned to the assignee of the present invention, now abandoned. With the servo system speed control of the present invention, very precise control of the start or stop intervals is achieved by converting the step input command signals into signals having the same form as the desired start or stop characteristic, and by servoing the capstan during start-stop times. The normal step input command signal derived from the command signal source 49 is shown in waveform A of FIG. 2, whereas the desired shape of the input signal for the servo system derived from the ramp generator are shown in waveform B. The ramp signal defines a constant slope leading edge for the step input command signal, which thereafter maintains the voltage level $V_r$ which is required to hold the nominal velocity in either direction.

Figure 3:
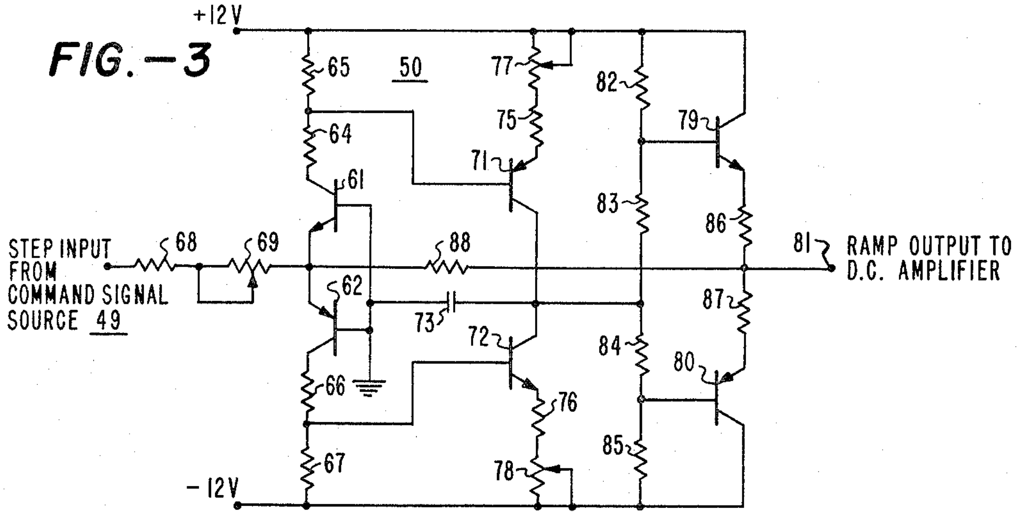
FIG. 3 is a simplified circuit diagram illustrating a ramp generator in accordance with the invention.
Figure 2:
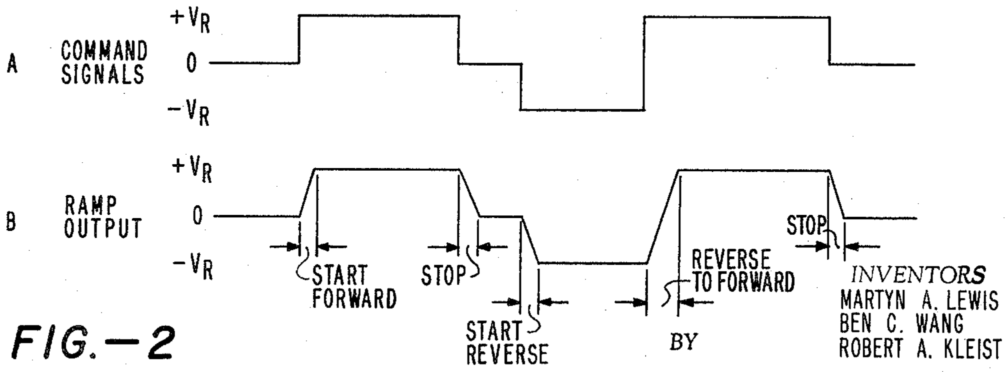
FIG. 2 is a graphical showing of variations with respect to time of various system parameters illustrating the characteristic operation of motor drive systems in accordance with the invention.

Due to the high gain of the servo system provided by the amplifier 47, the rotor voltage E is small in comparison with the magnitude of $V_r$ while still providing the necessary accelerating or decelerating current to the motor 44. Therefore, if the system friction increases during a start period, the error signal will be increased to provide the higher accelerating current needed to follow the desired start characteristic. Thus, the velocity-time characteristic of the tape movement is maintained the same as the input command shape even in the presence of friction and other load variations or variations of motor torque within the system. Accordingly, the start and stop times as well as the start and stop distances can be made as accurate and as consistent as the ramp function to the servo system, and the start distances may be made equal to the stop distances to provide greatly improved operation especially where incremental operation is desired, as will later be explained in more detail. Because most command signals available for tape transport control are step changes in voltage level, a ramp generator circuit is provided which is capable of converting the step changes into the desired ramp function, as shown by FIG. 2. Such a ramp generator circuit is shown in FIG. 3, which provides a ramp of constant slope in either direction in response to the step input command signals. The ramp generator circuit 50 has an input stage consisting of two oppositely conducting transistors 61 and 62 connected in a push-pull ground base amplifier arrangement. The collector terminal of the transistor 61 is connected through a pair of resistors 64 and 65 to a positive voltage supply, and the collector of the PNP transistor 62 is connected to a negative voltage supply through a pair of resistors 66 and 67. The command signals from the source 49 are applied through an input resistance consisting of the fixed resistor 68 and a variable resistor 69 to the emitter terminal of the first-pull connected transistors 61 and 62. When no command signal is received from the source 49, the emitters of the two transistors 61 and 62 are at virtual ground level and therefore non-conductive. However, when a command signal is received, one or the other of the transistors 61 or 62 saturates depending upon the polarity of the command signal.

The second stage of the ramp generator 50 consists of a pair of oppositely conducting transistors 71 and 72 connected in push-pull fashion to provide constant charging current to a capacitor 73 in response to the operation of the input stage. The emtiters of each of the transistors 71 and 72 are connected through a fixed resistor 75 or 76 respectively and a variable resistor 77 or 78, respectively, with the settings of the variable resistors 77 and 78 being adjusted to provide equal resistance values for the emitters of the two transistors 71 and 72. The constant current provided through the transistors 71 or 72 causes the voltage on the capacitor 73 to build up in linear fashion to be applied as an output signal to the final stage.

The final or output stage consists of a pair of transistors 79 and 80 of opposite conductivity types connected in push-pull emitter follower fashion to provide an output signal to an output terminal 81. The voltage developed on the capacitor 73 is applied to a pair of voltage divider circuits, each consisting of a pair of fixed resistors 82, 83 and 84, 85 connected to the opposite polarity voltage sources. The base terminals of the transistors 79 and 80 are each connected to the output terminal of the respective voltage divider, which is located at the junction between the two resistors. The collectors of the transistors 79 and 80 are connected directly to the respective voltage source, while the emitters are coupled through the respective fixed resistors 86 and 87 to the output terminal 81. A feedback resistor 88 connects the input terminal between the two input stage transistors 61 and 62 to the output terminal, and is typically made equal to the combined resistance value of the input resistors 68 and 69.

The following tabulation of resistance values is included herein for the purposes of explaining the operation of the ramp generator in accordance with the invention. Typical resistance values are:

| | Ohms |
|---|---|
| Resistor 64 | 2,700 |
| Resistor 65 | 2,700 |
| Resistor 66 | 2,700 |
| Resistor 67 | 2,700 |
| Resistor 68 | 1,000 |
| Rheostat 69 | (1) |
| Resistor 75 | 1,000 |
| Resistor 76 | 1,000 |
| Rheostat 77 | (2) |
| Rheostat 78 | (2) |
| Resistor 82 | 100,000 |
| Resistor 83 | 3,300 |
| Resistor 84 | 3,300 |
| Resistor 85 | 100,000 |
| Resistor 86 | 220 |
| Resistor 87 | 220 |
| Resistor 88 | 2,700 |

[1] 10,000 ohms max., set to 1,700 ohms.
[2] 10,000 ohms max., set to 5,000 ohms.

It will also be assumed that full scale positive and negative input commands are 5.4 volts and that full scale outputs are likewise 5.4 volts but of opposite polarity from the input command.

In operation, when a positive input command signal of 5.4 volts is applied as a step change from zero, the transistor 62 turns on and quickly saturates. With the transistor 62 saturated, almost the entire voltage drop of 12 volts appears across the two equal valued resistors 66 and 67, and the junction between is raised to a stable level of approximately −6 volts.

The −6 volt level is then applied to the base of transistor 72 causing it to conduct one milliampere of current through the 6,000 ohm resistance of the resistors 76 and 78 to charge the capacitor 73 negatively at a constant rate. The transistors 79 and 80, which were previously slightly forward biased by the voltage divider resistors 82, 83, 84 and 85, receive the constantly negative-going signal from the capacitor 73. This causes the transistor 79 to conduct less current and the transistor 80 to conduct more current progressively until the output terminal has reached a level of −5.4 volts. At that time, because the feedback resistor 88 is equal to the input resistance value of the resistors 68 and 69, the emitter terminals of the input stage transistors 61 and 62 are returned to zero to thereby cut off the transistor 62. This also cuts off transistor 72 to prevent further charging of the capacitor 73 in the negative direction, and since both transistors 71 and 72 are now cut off the charge on the capacitor 73 remains at this level without substantial discharge as long as the positive input command signal is maintained.

When the positive input command signal from the source 49 is removed, the input is changed instantaneously to zero. The output, however, remains instantaneously at the −5.4 level as the capacitor 73 cannot discharge instantaneously, and the negative-going signal is applied through the resistor 88 to turn on the transistor 61. The transistor 61 quickly saturates to reduce the voltage at the junction between the resistors 64 and 65 to +6 volts, thereby turning on the transistor 71 to discharge the capacitor 73 in a positive direction at a constant rate of one milliampere, which is precisely the same rate at which it was charged. The decreasing negative voltage from the capacitor 73 causes transistor 80 to conduct less and transistor 79 to conduct more progressively until the output terminal 81 has reached zero. This then returns the emitter of the transistor 61 to zero, turning off the transistor 61 and the transistor 71 to prevent further discharge of the capacitor.

Assuming now that the command signal input voltage was changed instantaneously to −5.4 volts instead of to zero, the transistor 61 would saturate as before, and transistor 71 would be turned on to discharge the capacitor 73 at the same constant current of one milliampere. However, in this case, the constant discharging current would continue to flow to charge the capacitor 73 in a positive direction until the output voltage had reached +5.4 volts, at which time the voltage on the emitter of the transistor 61 becomes zero to prevent further positive charging of the capacitor 73. The output would then remain at the steady level of +5.4 volts.

Thus, it may be seen that with a ramp generator 50 constructed in accordance with the invention, the step input command signal may be converted into a servo input signal with ramp functions of constant slope both at the leading and trailing ends to correspond to a desired start and stop characteristic. The slope of the ramp may be varied under the control of a setting of the variable resistors 77 and 78, while the final value of the ramp may be chosen by the setting of the variable resistor 69. An increase in the resistance value of the resistors 77 or 78 will decrease the rate of charging of the capacitor 73, thereby decreasing the slope of the ramp. A decrease in the value of the resistor 69 or an increase in the value of the feedback resistor 88 will increase the final value of the ramp. Alternatively, a conventional electronically variable resistance element may be placed in circuit with each resistor 77, 78, 69 and 88 to provide external control of the slope and final level. Accordingly, this ramp generator circuit 50 may be made to provide ramp output signals of a desired slope and value in response to step function command signals, as indicated by the waveforms of FIG. 2.

While this invention has been described with particular emphasis on digital recording techniques, it should be understood that the principles of this invention are equally applicable to other type recording systems, such as those employed to record frequency modulated signals. To provide the finer speed control at nominal velocity which is necessary for these other type systems, a graded disc and photocell system or any other conventional speed sensing device which provides the required accuracy may be employed in place of the tachometers. The graded disc arrangement provides an alternating signal, the frequency of which is proportional to the speed with which the disc is rotated, which may be converted to a DC signal having a magnitude accurately representing the speed sensed.

For very fine speed control in the order of ±0.1% of nominal speed, the alternating signal representative of actual speed may be phase locked with a reference signal from a synchronizing source after reaching nominal velocity. Alternatively, a very fine speed control during the start-stop operations can be realized through use of the graded disc arrangement in conjunction with a voltage controlled oscillator which, is coupled to receive the ramp speed control signal. In this manner, the ramp speed control signal is used to increase or decrease the frequency of the voltage controlled oscillator in the range between nominal velocity and zero velocity while the signal from the graded disc can be phase locked therewith for the fine speed control during acceleration and deceleration intervals.

One of the most important advantages of motor drive systems in accordance with this invention is that they may be used to provide equal start and stop distances which is of value to both normal digital transport operation as well as to incremental or step-by-step advance of the tape or other driven member. With the previous systems described in the heretofore mentioned patent application, the start distances were always greater than the stop distances due to the fact that the system was required to operate against the friction components during acceleration while the friction components aided the deceleration. With equal start and stop distances, a particular bit or group of information may be read out with the tape traveling in the opposite direction from that in which it was recorded, since the tape reaches nominal velocity within the same distance in either direction. Also, the greater control of the start and stop distances provides a much more uniform overall interval. The example of FIG. 4, described in conjunction with the waveform diagram of FIG. 5, shows how a single system in accordance with this invention may be used for incremental as well as continuous recording and reproducing.

All that is required for positive and controlled incrementing is that the command signal be terminated at a selected time to provide a predetermined total distance of tape movement for each step. The acceleration interval is terminated when or before nominal speed is reached, and deceleration may immediately be initiated at a corresponding rate. Thus the movement of the tape is changed from a fixed linear acceleration characteristic to a fixed linear deceleration characteristic of the same slope, and the total time of movement is in each case determined solely by the duration of the applied command pulse. Because the velocity changes are referenced to standard waveforms, the interval needed to achieve final velocity, and the distance traversed are both closely controlled.

Figure 4:
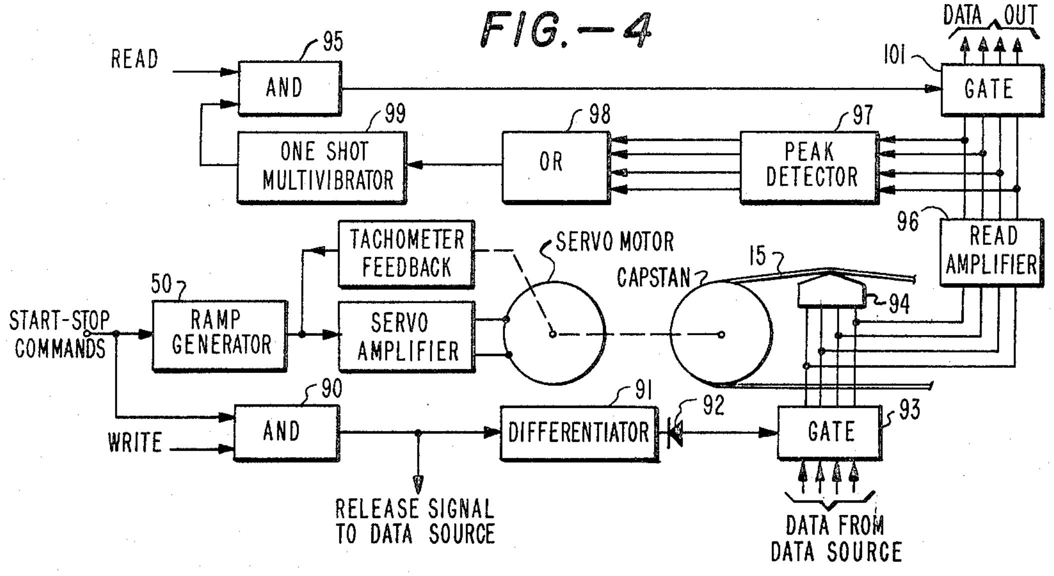
FIG. 4 is a simplified schematic block diagram representation of an incremental tape transport drive system in accordance with the invention; and, FIG. 5 is a graphical illustration of different system variables plotted against time and illustrating the operation of the incremental tape transport drive system of FIG. 4.

The system shown in FIG. 4 uses the start-stop command signals which are applied to the ramp generator 50 to control the recording and reproducing of data increments on the tape 15. For recording, a WRITE mode signal is applied to condition an AND gate 90 to pass the command signals to the writing circuitry. The trailing edge of the command pulse is detected by a differentiator 91 and passed through a diode 92 to enable a gate 93 which transfers the frame of digital data to the multi-head recording and reproducing assembly 94. The leading edge of the command pulse may be coupled as a release signal to the data source (not shown) to indicate that a new character may be made available for recording. The various elements are shown only in general form, inasmuch as many gating arrangements may be used in conventional fashion to accomplish the desired functions. For example, the data itself may trigger the impulse generator to initiate the incremental movement. Recording is preferably accomplished wtih the tape stationary, or concurrently with the command which initiates movement, although it may be undertaken at other times as well.

The reproducing mode may be initiated by enabling another AND gate 95 with a READ signal. The incremental tape motion begins with a command signal, and the frame of digital data detected by the head assembly 94 is subsequently fed through a read amplifier 96 to a peak detector 97. The first output signal from a peak detector 97 is passed by an OR gate 98 to actuate a one-shot multivibrator 99, which in turn produces a strobe pulse of short duration. The strobe pulse passes the enabled AND gate 95 and is applied as an enabling pulse to an output gate 101 to pass the frame of digital data. The strobe pulse is also applied to the start-stop control circuits to terminate the incrementing step. This system insures that only one frame of binary digits is read while the tape is in motion, and that the tape is stopped before the next frame, because of the positive control of start and stop distances.

Thus, it is important to note, the mechanical operation of a tape transport may be made synchronous with data on the tape, without use of sprocket holes and wheels or other mechanical form of stepping mechanism. Deviations in the stepping distance are compensated for by referencing to reproduced signals, and distance variations are therefore not cumulative. At the completion of an incrementing interval, the incrementing recording or reproducing process may immediately be repeated for the next frame of digital data.

Those skilled in the art will recognize that this system provides bidirectional incrementing movement useful in a wide variety of transport for web and other members.

It should be understood that changes in the details, which have been herein described and illustrated in order to explain the nature of the invention, may be made by those skilled in the art within the principle and scope of the invention as expressed in the appended claims.

What is claimed is:

1. A magnetic tape drive system comprising a capstan in constant contact with the tape surface for driving the tape bidirectionally, a motor coupled to the capstan and having an output torque proportional to the applied driving current, a high gain servo amplifier means for providing a driving motor current proportional to the difference between the actual motor speed and a desired motor speed, and ramp generator means responsive to input command signals for providing a ramp output signal voltage to the servo amplifier means, said output signal voltage having a controlled magnitude in accordance with desired motor speed and a selectable ramp function slope between desired level changes in accordance with desired acceleration and deceleration.

2. A motor drive system for bidirectionally driving a tape comprising a direct current motor having an output torque proportional to the magnitude of an applied driving current and coupled to drive the tape, a high gain amplifier means for providing a driving current to the motor proportional to an applied difference voltage signal, tachometer means coupled to the motor to provide a feedback voltage signal proportional to the actual speed of the motor, a command signal source for providing step function command signals having an amplitude and polarity indicative of the nominal speed of the tape to be obtained in a given direction, a ramp generator connected to receive said command signals and provide an output signal to said amplifier means having a selectable ramp function between changes in amplitude, and means connected to receive the feedback voltage signal and the output signal from the ramp generator means for providing a difference voltage signal through said amplifier means proportional to the difference between the actual motor speed and the desired motor speed, whereby the actual speed of the motor is controlled in accordance with the desired speed as represented by the selected ramp function during start and stop operations.

3. A bidirectional magnetic tape drive system comprising a bidirectional electrical motor having an output torque proportional to the magnitude of an applied driving current and a rotational direction responsive to the polarity of the applied driving current, capstan means coupled to and responsive to the rotational movement of said motor, said capstan maintaining constant frictional contact with a magnetic tape member, tape tension means for maintaining the tape tension on opposing sides of said capstan minimal and substantially equal, servo means including an amplifier coupled to apply the driving current to the electrical motor in accordance with the polarity and magnitude of an applied error signal, said error signal representing the difference between an input signal representative of the desired motor speed and a feedback signal representative of the actual motor speed, and an input circuit means responsive to command signals and providing an input signal to the servo means having a controlled ramp function slope between desired level changes, whereby acceleration or deceleration of the motor is controlled in accordance with the slope of the input signal.

4. In a capstan tape drive system, the combination including a capstan in constant frictional contact with the tape surface, tape tension means for maintaining the tape tension on opposing sides of said capstan minimal and substantially equal, a high gain servo system including a bidirectional output motor coupled directly to drive the capstan to provide an output torque proportional to the magnitude of an applied error signal and also including a feedback means for sensing the actual speed and direction of the motor to provide a feedback signal to the input of the servo means, ramp generator means responsive to input command signals for providing to said servo system an input ramp signal having a maximum amplitude indicative of the desired motor speed, a polarity indicative of desired rotational direction and a selectable slope between desired level changes indicative of desired motor acceleration and deceleration, whereby said servo system provides the necessary accelerating or decelerating torque to the capstan to control the accelerating and decelerating characteristics of the tape in accordance with the selected function of the applied input ramp signal.

5. A tape drive system comprising a capstan in constant non-slip contact with the tape surface, tape tension means for maintaining the tape tension on opposing sides of said capstan minimal and substantially equal, a high gain velocity type servo system for providing accelerational decelerational torques to drive the capstan at a desired speed and in a direction in accordance with the magnitude and polarity of an applied input signal, a source of step function command signals, and ramp function generating means coupled to receive said step function command signal and provide an input signal to the servo means in which the leading and trailing edges of the input signals have a selected slope representative of a desired accelerational or deceleration characteristic.

6. A function generator for receiving step function input sand providing outputs similar to the input signal, but having selected slope ramp functions at the leading and trailing edges, comprising a saturable amplifier input stage responsive to the step function input for providing a constant control signal, a capacitor, means responsive to said control signal for providing a constant charging current to said capacitor, an output stage coupled to said capacitor to provide an output proportional to the charge on said capacitor, and a negative feedback means connected between the input to the saturable amplifier means and the output to gradually reduce the voltage at the input due to a step function input until the voltage at the input has reached zero, thereby cutting off the saturable amplifier means and preventing further charging current from flowing to the capacitor.

7. A function generator circuit for providing a predetermined slope to the leading and trailing edges of step function input signals comprising a capacitor, means responsive to a control voltage generator by the step function change in the level of the input signal to provide a constant charging current to said capacitor, means coupled to and responsive to the magnitude of the instantaneous charge on said capacitor for providing an output signal representative thereof, but of opposite polarity from the input signal, and negative feedback means coupled between the output and the input of the circuit to gradually reduce the level of the control voltage in accordance with the level of the output signal.

8. An incremental tape drive system for digital recording comprising a single drive capstan in constant engagement with the tape, tape tension means for maintaining the tape tension on opposing sides of said capstan minimal and substantially equal, a driving motor coupled to the capstan, servo means for providing an accelerating torque to the driving motor for maintaining the capstan speed proportional to the instantaneous magnitude of the applied input signal, and ramp generator means responsive to step function command signals for providing input ramp signals to the servo system having a constant accelerating slope upon initiation of the step function and a constant decelerating slope on termination of the step function, whereby acceleration and deceleration of the tape are accomplished in equal tape intervals.

9. An incremental drive system for a web member comprising a capstan in constant non-sliding engagement with the web member, tape tensioning means for maintaining the tape tension on opposing sides of said capstan minimal and substantially equal, driving motor means coupled to the capstan, servo means exciting said motor for providing a driving torque to the motor to maintain the motor speed proportional to the instantaneous magnitude of an applied input signal, command signal means for providing step function command signals having a predetermined interval, and ramp function generating means coupled intermediate the command signal means and the servo means to receive the step function command signal from the command signal, said ramp function generating means providing to the servo means a ramp function signal of a constant accelerating slope upon initiation of the step function and providing a constant decelerating slope on termination of the step function command signal.

10. An incremental drive system for a magnetic tape recorder system comprising a single drive capstan in non-slip engagement with the tape surface, a direct current motor having a high torque to armature inertia ratio and an increasing torque for an increasing energizing signal over a substantial range, means providing successive increment command signals in the form of individual step function pulses of selected time duration, the duration of the pulses defining the accelerating interval, ramp generator means responsive to the command signal for providing a constantly increasing acceleration signal during the acceleration interval and a constantly decreasing magnitude signal during a deceleration interval after termination of the command signal to the servo means, the slope of the increasing portion of the signal being equal to the slope of the decreasing portion of the signal, whereby said tape is accelerated for a distance equal to the distance during which it is decelerated.

11. A magnetic tape transport system for digital data processing, comprising a driving motor for moving the tape, said driving motor having an accelerational torque in accordance with the level of an applied driving current, a high gain servo means for providing a driving current to the driving motor proportional to the difference between the actual motor speed and the desired motor speed, and ramp generator means responsive to step input command signals for providing an input ramp signal voltage to the servo means indicative of the desired motor speed during processing of data of said tape, said input ramp signal voltage having a selectable constant slope between voltage level changes indicative of desired acceleration and deceleration during record gaps on said tape, whereby the accelerational and decelerational characteristics of the current motor are controlled in accordance with the slope of the signal voltage.

12. A motor drive system for bidirectionally driving a magnetic tape at high speeds and accelerations comprising a direct current motor having an output torque proportional to the magnitude of an applied driving current and coupled to drive the tape, high gain amplifier means for providing a driving current to the motor proportional to an applied difference voltage signal, tachometer means coupled to the motor to provide a feedback voltage signal proportional to the actual speed of the motor, a command signal source for providing step function command signals having an amplitude and polarity indicative of the nominal speed of the tape to be maintained in a given direction, ramp generator means connected to receive said command signals and provide an output signal to said amplifier means in accordance with a selectable ramp function between changes in amplitude of said command signal, and means connected to receive the feedback voltage signal and the output signal from the ramp generator means for providing a difference voltage signal proportional to the difference between the actual motor speed and the desired motor speed, said ramp generator comprising a saturable amplifier input stage responsive to said step function command signals for providing a constant control signal, a capacitor, means responsive to said control signal for providing a constant charging current to said capacitor, an output stage coupled to said capacitor to provide an output proportional to the charge on said capacitor, and negative feedback means connected between the input to the saturable amplifier means and the output to linearly change the signal applied to the saturable amplifier means upon the occurrence of a command signal transition.

References Cited

UNITED STATES PATENTS

| | | | |
|---|---|---|---|
| 2,716,450 | 8/1955 | Nicholson | 318—6 XR |
| 3,105,179 | 9/1963 | Young et al. | 318—6 |
| 3,187,243 | 6/1965 | Long | 318—6 |
| 3,185,364 | 5/1965 | Kleist | 226—24 |
| 2,308,752 | 1/1943 | Hadfield | 328—178—XR |
| 2,885,620 | 5/1959 | Haas | 318—286 |
| 3,163,272 | 12/1964 | Baumann | 318—341 X |
| 3,293,522 | 12/1966 | Lewis | 318—257 |
| 2,502,189 | 3/1950 | Walker et al. | 318—310 |
| 2,791,737 | 5/1957 | MacNichol | 318—310 |
| 2,497,766 | 2/1950 | Hadfield | 328—178 |
| 2,928,003 | 3/1960 | Etter | 328—178 |

BENJAMIN DOBECK, *Primary Examiner.*

S. GORDON, *Assistant Examiner.*

UNITED STATES PATENT AND TRADEMARK OFFICE
CERTIFICATE OF CORRECTION

PATENT NO. : 3,379,948

DATED : April 23, 1968

INVENTOR(S) : Martyn A. Lewis et al

It is certified that error appears in the above-identified patent and that said Letters Patent are hereby corrected as shown below:

In Fig. 1, in the upper lefthand corner, "25" should read --35--. Col. 4, line 71, between "paths" and "tape", "of" should read --and--. Col. 6, line 38, between "push-pull" and "base", "ground" should read --grounded--; line 57, between "The" and "of", "emtiters" should read --emitters--. Col. 11, claim 4, line 10, between "servo" and ", ramp", "means" should read --system--; claim 5, line 31, between "command" and "and", "signal" should read --signals--; claim 5, line 32, between "servo" and "in", "means" should read --system--; claim 5, line 34, between "or" and "char-", "deceleration" should read --decelerational--; claim 6, line 37, before "providing", "input sand" should read --inputs and--; claim 6, line 47, between "amplifier" and "and", "means" should read --stage--; claim 6, line 50, between "amplifier" and "and", "means" should read --stage--; claim 7, line 55, between "voltage" and "by", "generator"

UNITED STATES PATENT AND TRADEMARK OFFICE
CERTIFICATE OF CORRECTION

PATENT NO. : 3,379,948

DATED : April 23, 1968

INVENTOR(S) : Martyn A. Lewis et al

It is certified that error appears in the above-identified patent and that said Letters Patent are hereby corrected as shown below:

should read --generated--; claim 8, line 73, between "of" and "applied", "the" should read --an--; claim 8, line 75, between "servo" and "having", "system" should read --means--. Col. 12, claim 9, line 19, before "said ramp func-", "signal," should read --signal means,--; claim 11, line 58, between "the" and "motor", "current" should read --driving--. Col. 13, claim 12, line 7, between "ramp generator" and "comprising", insert --means--; claim 12, line 15, between "plifier" and "and", "means" should read --input stage--; claim 12, line 16, between "amplifier" and "upon", "means" should read --input stage--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*